United States Patent [19]

Kawakami

[11] Patent Number: 5,097,346
[45] Date of Patent: Mar. 17, 1992

[54] VIDEO SIGNAL REPRODUCING APPARATUS HAVING A FIELD MEMORY FOR STILL PICTURE REPRODUCTION

[75] Inventor: Kiyotada Kawakami, Osaka, Japan

[73] Assignee: Sanyo Electric Co., Ltd., Osaka, Japan

[21] Appl. No.: 378,750

[22] Filed: Jul. 11, 1989

[30] Foreign Application Priority Data

Jul. 13, 1988 [JP] Japan .................. 63-174617

[51] Int. Cl.⁵ .............................................. H04N 5/76
[52] U.S. Cl. ..................................... 358/335; 358/310; 358/342
[58] Field of Search ............... 358/335, 336, 342, 312, 358/310; 360/10.1, 10.2, 10.3, 38.1

[56] References Cited

U.S. PATENT DOCUMENTS 4,635,134  1/1987  Sasamura et al. ............... 358/312
4,858,030  8/1989  Oru et al. ......................... 358/342
4,882,633  11/1989  Nakatami et al. ............... 358/339

FOREIGN PATENT DOCUMENTS 58-139577  8/1983  Japan .
2173632A  10/1986  United Kingdom .

OTHER PUBLICATIONS

"A-66D VHS Loading Digital Memory", Ikusawa et al., TV Technique, Nov. 1985, pp. 35-39.

Primary Examiner—Robert L. Richardson
Assistant Examiner—Robert Chevalier
Attorney, Agent, or Firm—Armstrong, Nikaido, Marmelstein, Kubovcik & Murray

[57] ABSTRACT

In a video signal reproducing apparatus having a field memory for still picture reproduction, the period Ti of reading a still picture signal from the field memory is altered to different lengths of time to repeat the reading operation for the different periods as one cycle. The sum of the reading periods Ti within one cycle is equal to the vertical synchronizing signal period Tv times an integer. Each of the reading periods Ti is set to a value equal to the period Tc of color subcarrier times an integer, approximate to the horizontal synchronizing signal period Th times an integer to the greatest possible extent and approximate to the vertical synchronizing signal period Tv to the greatest possible extent. Accordingly, there is no disturbance in the color subcarrier period at the function between fields, while the disturbance in the horizontal synchronizing signal period at the field junction can be greatly diminished.

7 Claims, 3 Drawing Sheets

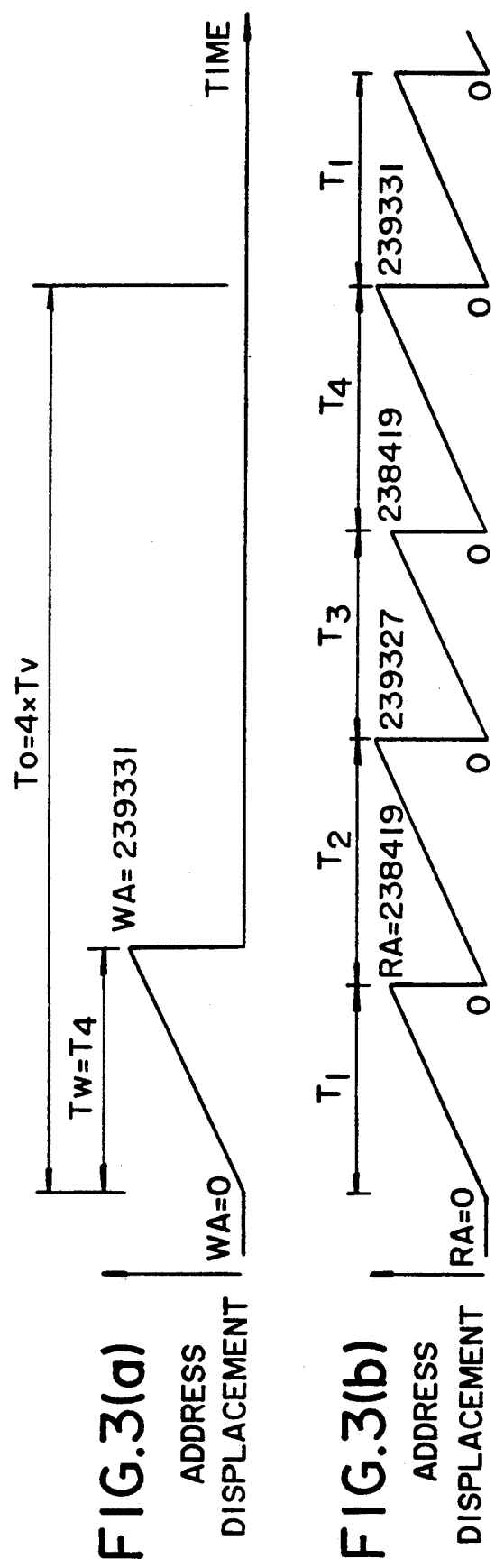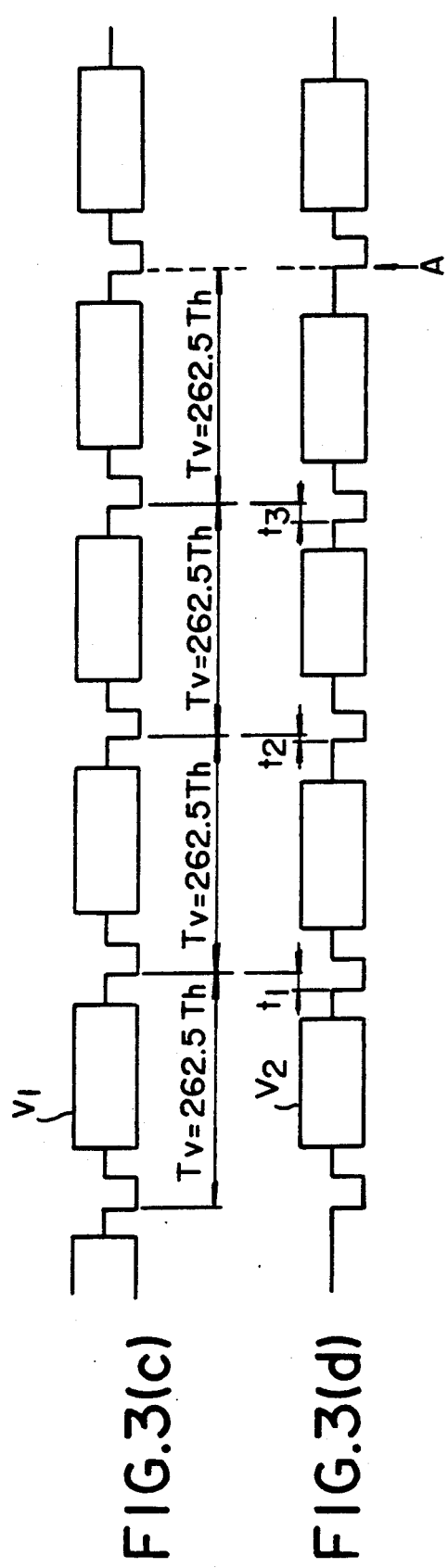

VIDEO SIGNAL REPRODUCING APPARATUS HAVING A FIELD MEMORY FOR STILL PICTURE REPRODUCTION

FIELD OF THE INVENTION

The present invention relates to video disc players and like apparatus for reproducing video signals from signal recording media such as optical video discs, and more particularly to video signal reproducing apparatus equipped with a field memory for special reproduction such as still-picture reproduction or fast reproduction.

BACKGROUND OF THE INVENTION

As signal recording media for optical disc players, two kinds of discs are generally available: CAV (constant angular velocity) discs wherein video signals are recorded at a constant angular velocity for two fields per turn of track, and CLV (constant linear velocity) discs wherein video signals are recorded at a constant linear velocity.

With the CLV disc, synchronizing signals are recorded on a spiral track at equal spacings and are not aligned radially of the disc, so that when the pickup is caused to jump the track radially of the disc for special reproduction such as still-picture reproduction, the period of reproduction synchronizing signals is disturbed. Consequently, a color loss, disturbance in vertical synchronization, horizontal skew or the like occurs in the picture that is reproduced.

Accordingly, a video disc player has been proposed which is adapted to reproduce a still picture from the CLV disc by repeatedly causing the pickup to jump from a first position to a second position preceding the first position by approximately one frame while detecting these first and second positions so as to intermittently output the signals of one frame recorded in the track portion of the second position through the first position (Unexamined Japanese Patent Publication SHO 58-139577).

However, the proposed video disc player requires a complex circuit for detecting the first and second positions. Moreover, the jumping action of the pickup for still-picture reproduction makes discontinuous the color subcarrier which is prepared based on the color burst extracted from the reproduction video signal, giving rise to the problem that a color loss occurs in the picture reproduced.

With advances in video memory techniques in recent years, on the other hand, inexpensive field memories have been developed which are capable of storing video signals for one frame. The use of such field memories in video disc players has been investigated to realize various modes of special reproduction.

Nevertheless, with field memory application techniques heretofore generally known, the period of writing video signals in the field memory and the period of reading video signals therefrom are both accurately set to 262.5 times the regular field period (i.e. horizontal synchronization period Th) so that the following problem is encountered.

When video signals of NTSC system are written in the field memory with the period of 262.5Th and are thereafter repeatedly read out from the momory with the period of 262.5Th for reproducing a still picture, the writing/reading period includes the fraction of 0.5Th thereby disturbing at the junction of fields the period of horizontal synchronizing signals included in the reproduction signals to create a skew.

With the NTSC system, there is the following relationship between the color subcarrier period Tc and the horizontal synchronizing signal period Th, wherein $$Th = (455/2)Tc.$$

Accordingly, the number of waves of the color subcarrier included in one field period (262.5Th) is not an integer with the result that the subcarrier period also involves a disturbance at the junction of fields which gives rise to the problem of a color loss.

On the other hand, the magazine "TV Technology" (published by Nippon Denshi Shuppan Co., Ltd., Nov. 1985, pp. 35-39) discloses a video tape recorder wherein the period of reading out data from the field memory is changed over between 262Th and 263Th for every field, such that the change-over period is set to 525Th (=262.5Th×2) for every two fields; i.e., every frame. This method, if applied to the video disc player, obviates the disturbance in the period of horizontal synchronizing signals at the field junction to preclude the occurrence of the skew.

Neverthless, when the reading period for the field memory is set to 263Th, the period 263Th has the following relationship with the period Tc:

$$263Th = 263 \times (455/2)Tc = 59832.5Tc.$$

The number of waves of the color subcarrier included in this period is therefore not an integer so that the color subcarrier period becomes inevitably disturbed at the field junction.

SUMMARY OF THE INVENTION

An object of the present invention is to provide a video signal reproducing apparatus, such as a video disc player, which has a field memory and in which a suitable value different from the conventional value of 262.5Th is selected as the period of reading out data from the field memory to thereby realize special reproduction of pictures with a high quality free from a horizontal skew or color loss.

Another object of the invention is to provide a video signal reproducing apparatus which can be changed over from a mode wherein the video signals stored in the field memory are repeatedly read out for special reproduction to a mode wherein signals are reproduced directly from a video disc or like signal recording medium, without entailing a disturbance in the picture upon the changeover.

With the video signal reproducing apparatus of the invention, the video signals reproduced from a signal recording medium for one field are stored in a field memory and are thereafter repeatedly read out from the field memory. The period Ti of reading video signals for one field is determined as follows.

The reading period Ti is altered to $T_1, T_2, \ldots, T_n$ in succession within the vertical synchronizing signal period Tv times an integer n, i.e. within a period $n \times Tv$, and reading for the period $n \times Tv$ as one cycle is repeated. The reading periods Ti ($i = 1, 2, \ldots, n$) are so determined as to satisfy the relationship expressed by:

$$\sum_{i=1}^{n} Ti = n \times Tv$$

$$Ti = m \times Tc \simeq k \times Th \simeq Tv,$$

wherein Th is the horizontal synchronizing signal period, Tv is the vertical synchronizing signal period, Tc is the color subcarrier period, and m and k are each an integer.

Consequently, the number of waves of the color subcarrier within each reading period Ti becomes an integer. Each reading period Ti is approximate to the horizontal synchronizing signal period Th times an integer to the greatest possible extent and is also approximate to the vertical synchronizing signal period Tv to the greatest possible extent.

Accordingly, the color subcarrier period is not disturbed at the field junction, while the disturbance in the horizontal synchronizing signal period at the field junction is very small and causes no trouble to the reproduction operation of the signal reproducing apparatus. Furthermore, the special reproduction mode employing the field memory can be changed over to the mode of reproduction from the recording medium with a greatly diminished disturbance in the vertical synchronizing signal period without disturbing the picture upon the change-over.

BRIEF DESCRIPTION OF THE DRAWINGS

FIGS. 3 (a) to (d) are timing charts for illustrating signal writing and reading operations of the circuit of FIG. 1.

DETAILED DESCRIPTION OF THE EMBODIMENT

Figure 1:
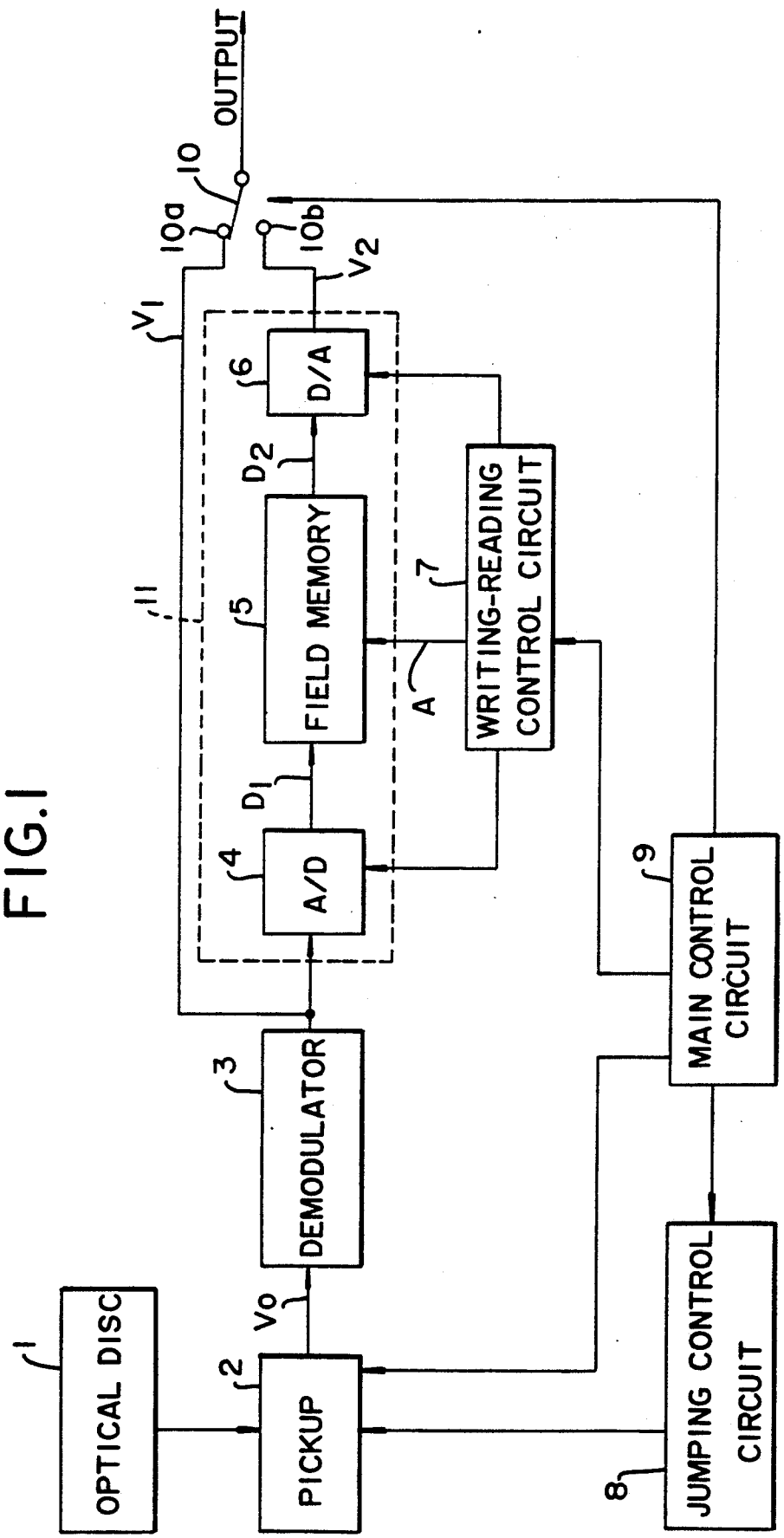
FIG. 1 is a block diagram showing the circuit of a video signal reproducing apparatus embodying the invention.

FIG. 1 shows the construction of an optical video disc player embodying the present invention.

The disc player is adapted to reproduce video signals from both the CLV disc and the CAV disc. The player is settable in two modes: one mode wherein video signals from either one of the discs are written in a field memory once, and the video signals for one field are repeatedly read out from the field memory (hereinafter referred to as the "field still reproduction mode", and the other mode for use with the CAV disc wherein the pickup repeats a track jumping action to repeatedly reproduce video signals for one frame from the same track portion (hereinafter referred to as the "frame still reproduction mode").

Construction of the Apparatus

A pickup 2 for reproducing video signals from an optical disc 1 has an optical system (not shown) including an objective lens, semiconductor laser, photodiode, etc. as is already known, and optically traces a spiral track in the signal recording surface of the disc while being transported radially of the disc 2 by transport means (not shown) comprising a linear motor, etc.

The pickup 2 is further provided with electromagnetic drive means (not shown) for jumping the pickup for special reproduction with the orientation of the optical axis of the optical system changed. The electromagnetic drive means comprises a magnet provided on a movable assembly including the optical system, and a tracking coil provided around the movable assembly for driving the magnet in the tracking direction as already known.

A jumping control circuit 8 is connected to the pickup 2. The circuit 8 prepares jumping pulses specified in pulse width and period and feeds the pulses to the electromagnetic drive means for special reproduction.

A main control circuit 9 comprises a microcomputer for collectively controlling the operation of the video disc player.

The FM reproduction signal $V_O$ from the pickup 2 is frequency-demodulated by a demodulator circuit 3, which feeds an output signal to a memory circuit 11 controlled for writing and reading by a control circuit 7.

The output signal $V_1$ of the demodulator circuit 3 and the output signal $V_2$ of the memory circuit 11 are applied respectively to a pair of fixed contacts 10a, 10b of a change-over switch 10 controlled by the main control circuit 9.

In a mode for reproducing usual motion pictures or in the frame still reproduction mode, the changeover switch 10 has its fixed contact 10a closed for selecting the output signal $V_1$, while in the field still reproduction mode, the fixed contact 10b is closed for selecting the output signal $V_2$. The switch is thus operated for a change-over when the vertical synchronizing signals of the two output signals $V_1$ and $V_2$ are approximately in phase.

The output signal $V_1$ or $V_2$ selected by the changeover switch 10 is fed to a subsequent monitor and displayed on its screen.

The memory circuit 11 comprises a field memory 5, an A/D converter 4 preceding the memory and a D/A converter 6 subsequent to the memory.

The A/D converter 4 samples the output signal $V_1$ of the demodulator circuit 3 at 4 times the frequency Fsc (about 3.58 MHz) of the color subcarrier: i.e., at a sampling frequency 4Fsc to convert the signal to a digital signal $D_1$.

For signal writing, the field memory 5 stores the digital signal $D_1$ at the address specified by an address signal A produced from the writing-reading control circuit 7. For signal reading, the data stored at the address specified by the address signal A is delivered as a digital signal $D_2$. The period $T_i$ of reading the video signals (digital signal $D_2$) for one field varies in succession from field to field in the manner of: $T_1 \rightarrow T_2 \rightarrow T_3 \rightarrow T_4 \rightarrow T_1 \rightarrow T_2 \rightarrow \ldots$ as will be described later.

The D/A converter 6 converts the digital signal $D_2$ to the original analog signal.

Period of Reading from the Field Memory

Suppose the color subcarrier period is Tc, the horizontal synchronization period is Th and the vertical synchronization period is Tv. The periods $T_i$ of reading the digital signal $D_2$ from the field memory 5 are set to the following values.

$T_1 = 59605Tc = 262Th \simeq Tv$
$T_2 = 59832Tc \simeq 263Th \simeq Tv$
$T_3 = T_1$
$T_4 = 59833Tc \simeq 263Th \simeq Tv.$ The following relationship is then established:

$$\sum_{i=1}^{4} Ti = T_1 + T_2 + T_3 + T_4 = 238875Tc$$
$$= (455/2) \times 262.5 \times 4 \times Tc$$
$$= 262.5 \times 4 \times Th$$
$$= 4Tv$$

When the sampling frequency of the D/A converter 6 is set to 4Fsc in this case, the number of times $M_1$ the signal is sampled within each period Ti is as follows:

$$M_1 = 59605 \times 4 = 238420$$
$$M_2 = 59832 \times 4 = 239328$$
$$M_3 = 238420$$
$$M_4 = 59833 \times 4 = 239332.$$

Accordingly, for example, during the first reading period $T_1$, 238420 address signals for 0 address to 238419 address are fed to the field memory 5 for signal reading.

Writing-Reading Control Circuit

Figure 2:
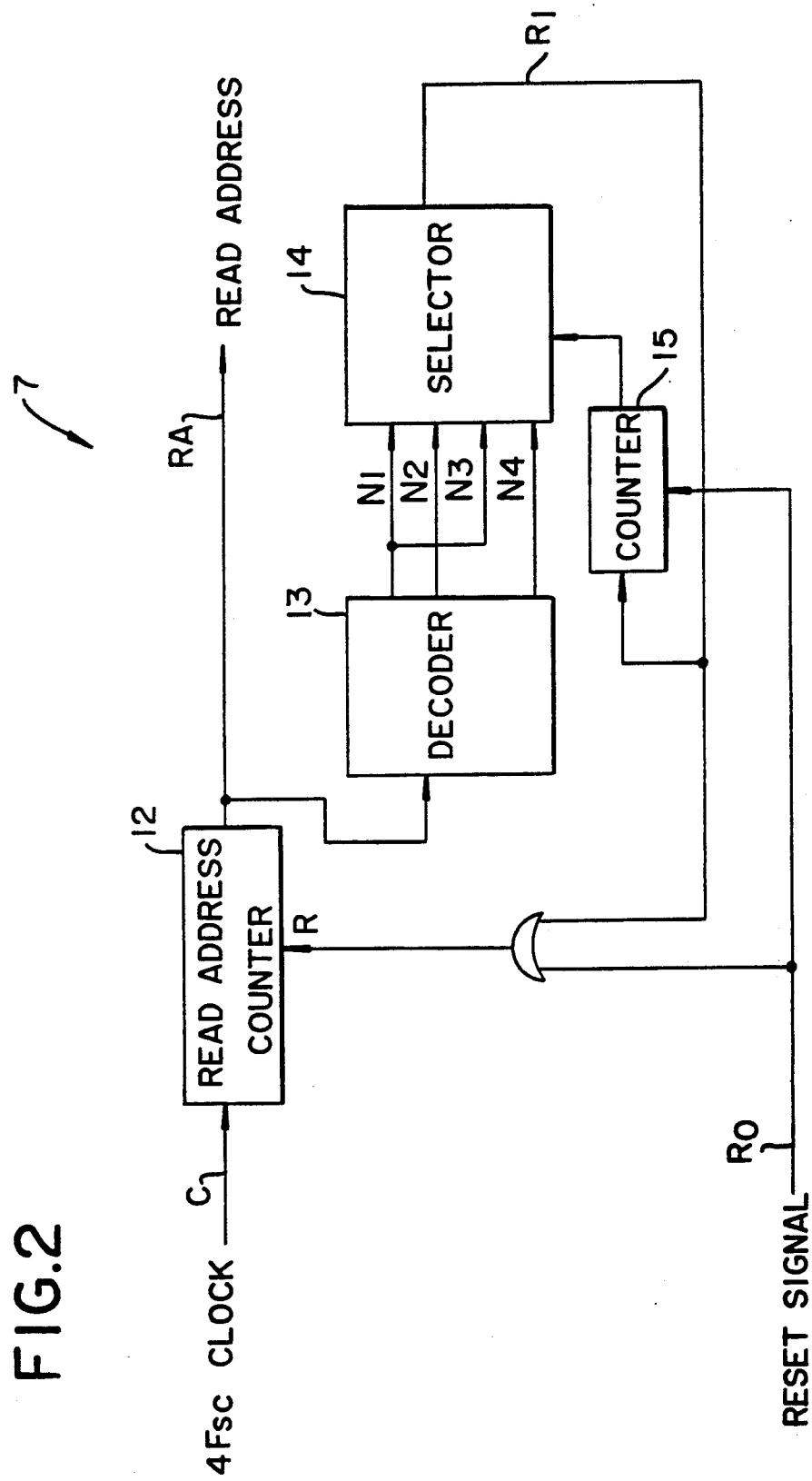
FIG. 2 is a block diagram showing an example of writing-reading control circuit of FIG. 1.

FIG. 2 shows a specific example of writing-reading control circuit 7 for use with the field memory for which the reading period Ti is set as above.

A read address counter 12 is driven by a clock C with a frequency of 4Fsc for producing read addresses RA starting with 0 address. The counter is reset to "0" with a reset signal R ($R_0$ or $R_1$ mentioned below).

A decoder 13 decodes the read address RA and prepares a specified identification signal $N_1$, $N_2$, $N_3$ or $N_4$ based on the result. More specifically, the identification signals $N_1$ and $N_3$ change to high level only when the read address RA is 238419 address, the identification signal $N_2$ changes to high level only when RA is 239327 address, and the identification signal $N_4$ changes to high level only when RA is 239331 address.

The decoder 13 has output terminals connected to a selector 14 which is operated in accordance with the count value of an auxiliary counter 15. The selector 14 selects the identification signal $N_1$ when the count value of the counter 15 is 4 times an integer: i.e., 4n, or the identification signal $N_2$ when the value is 4n+1, or the identification signal $N_3$ when the value is 4n+2, or the identification signal $N_4$ when the value is 4n+3.

The identification signal selected by the selector 14 is sent to the read address counter 12 as the reset signal $R_1$. The reset signal $R_1$ is fed also to the auxiliary counter 15 as a clock signal such that the counter 15 is caused to count up upon the reset signal $R_1$ changing from high level to low level.

Further, the reset signal $R_0$ which is fed to the read address counter 12, when starting the reading from the field memory 5, is also fed to the reset terminal of the auxiliary counter 14.

Accordingly, the identification signal $N_1$, for example, changes to high level when the read address RA changes to 238419 address in the case where the signal $N_1$ is selected by the selector 14. Thus, the reset signal $R_1$ changes to high level, resetting the read address counter 12.

Consequently, the read address RA changes to 0 address, whereupon the identification signal $N_1$ changes to low level. With the reset signal $N_1$ also changing to low level, the auxiliary counter 15 is caused to count up for the selector 14 to select the identification signal $N_2$.

By virtue of the counting and resetting operation, as described, the read address RA from the read address counter 12 changes as follows: 0, 1, 2, ..., 238419, 0, 1, 2, ..., 239327, 0, 1, 2, ..., 238419, 0, 1, ..., 239331, 0, 1, ...

Reading-Writing Control Operation

FIG. 3 illustrates the reproduction operation of the video disc player for a CAV disc to obtain still pictures More specifically, FIG. 3 (a) shows the displacement of write address WA, and FIG. 3 (b) the displacement of read address RA. FIGS. 3 (c) and (d) show the relationship in phase between the still picture signal $V_1$ directly delivered from the demodulator circuit in the frame still reproduction mode and the still picture signal $V_2$ read out from the field memory in the field still reproduction mode.

The operation of the writing-reading control circuit 7 shown in FIGS. 1 and 2 will be described below with reference to FIG. 3.

When a signal is given by the main control circuit 9 to the writing-reading control circuit 7 to command still picture reproduction, the write address counter (not shown), the read address counter 12 and the auxiliary counter 15 are reset with the reset signal $R_0$. The write address counter specifies write addresses for the field memory 5 to start storing video signals. The period Tw of writing the signals for one field is set to the same value as the longest of the reading periods $T_1$ to $T_4$, i.e., the fourth reading period $T_4$ in the present case as seen in FIG. 3. As a result, the write address changes from 0 address, to 239331 address as shown in FIG. 3 (a).

A very short period after the start of writing, data reading from the field memory is started, as shown in FIG. 3 (b). As already stated, the single reading period Ti varies successively like $T_1 \rightarrow T_2 \rightarrow T_3 \rightarrow T_4$. In the first reading period $\Gamma_1$, the data at 0 address through 238419 address in the field memory is read out, followed by the second to fourth periods $T_2$, $T_3$ and $T_4$ during which the data is read from 0 to 239327 addresses, 0 to 238419 addresses and 0 to 239331 addresses, respectively.

The vertical synchronization period of the still picture signal $V_1$ obtained in the frame still reproduction mode is always accurately maintained at Tv, i.e. 262.5Th, whereas in the field still reproduction mode, the vertical synchronization period of the still picture signal $V_2$ read out in each reading period Ti slightly differs from Tv so that phase differences $t_1$, $t_2$ and $t_3$ occur for the first three fields between the vertical synchronizing signals of the still picture signals $V_1$ and $V_2$ as shown in FIGS. 3 (c) and (d).

However, there is the relationship of:

$$T_1 + T_2 + T_3 + T_4 = 1050Th = 4Tv$$

as already stated. Accordingly, when signal reading has been completed for four fields, the vertical synchronizing signals are in phase as indicated by the arrow A. Thus, the vertical synchronizing signals of the two still picture signal match in phase every four fields.

The phase differences $t_1$, $t_2$ and $t_3$ between the vertical synchronizing signals are expressed by:

$$t_1 = (455/2) \times 262.5Tc - 59605Tc = 113.75Tc = 0.5Th$$

-continued $$t_2 = \{(455/2) \times 262.5Tc - 59832Tc\} + 113.75Tc$$
$$= 0.5Tc \simeq 0.002Th$$
$$t_3 = \{(455/2) \times 262.5Tc - 59605Tc\} + 0.5Tc$$
$$= 114.25Tc \simeq 0.502Th$$

Thus, the differences are about 0.5Th or smaller and as small as about ±0.2% of the vertical synchronization period Tv if greatest.

On the other hand, the disturbance in the horizontal synchronizing signal period will be considered based on the case wherein the period of reading the data for one field is 263Th. The disturbance at the junction between the second field and the third field is expressed by:

$$T_2 - 263Th = 59832Tc - 263Th$$
$$= (2/455) \times 59832 \times Th - 263Th$$
$$= -0.0022Th$$

The disturbance at the junction between the fourth field and the subsequent first field is expressed by:

$$T_4 - 263Th = 59833Tc - 263Th$$
$$= (2/455) \times 59833 \times Th - 263Th$$
$$= 0.00219Th$$

Thus, the disturbances are about ±0.2% of the horizontal synchronization period Th.

The phase differences between the vertical synchronizing signals, as well as the disturbances in the horizontal synchronizing signal period, are within the range of allowable errors permitting normal vertical or horizontal synchronization for common television receivers and therefore pose no problems.

Moreover, since the reading periods $T_1$ to $T_4$ are set to the color subcarrier period Tc times an integer as already described, the color subcarrier is always continuous and causes no faults such as a color loss.

Change of Mode

When the disc player shown in FIG. 1 is used for reproducing video signals from the CAV disc, the player can be changed over from the field still reproduction mode directly to the frame still reproduction mode by operating the switch 10. Generally, in the field still reproduction, images with a brisk motion can be reproduced with a satisfactory quality, but images with a diminished motion is reproduced with a lower resolution than in the frame still reproduction mode. With the disc player of FIG. 1, one of the two modes is selected for the image to be reproduced, whereby an optimal still picture can be obtained Further, when the switch 10 of FIG. 1 as closed at the fixed contact 10b for the memory circuit is alternatively closed at the fixed contact 10a for the demodulator circuit for a change-over from the field still reproduction mode to the frame still reproduction mode, the vertical synchronizing signal phase difference is always within the range of allowable errors as stated above irrespective of the change-over timing. Consequently, the mode can be changed quickly without producing disturbances in the picture.

When conventional disc players are changed over from the field still reproduction mode to the frame still reproduction mode, the change-over inevitably entails a vertical synchronizing signal phase difference so that the period of reading data from the field memory is made longer or shorter than the usual period to thereby diminish the disturbance of pictures as quickly as possible. Nevertheless, the special procedure resorted to entails the problem whereby the picture becomes enlarged or contracted vertically.

With the disc player of the present invention, however, there is no need to follow the conventional special procedure since the switch can be operated without disturbing the vertical synchronizing signals.

When the disc player of FIG. 1 is changed over from the field still reproduction mode to the usual reproduction mode, the jumping-back action of the pickup 2 is interrupted immediately after the switch 10 is operated. As in the above case, this change-over can be effected without disturbing the picture.

The reading periods Ti for the field memory can be in various combinations insofar as the following relationship can be fulfilled:

$$\sum_{i=1}^{n} Ti = n \times Tv, \text{ and}$$

$$Ti = m \times Tc \simeq k \times Th \simeq Tv,$$

wherein n, m and k are each a natural number.

For example, the reading period Ti can be altered as follows for four fields as one cycle:

$$T_1 = 59606Tc \simeq 262Th \simeq Tv$$
$$T_2 = 59832Tc \simeq 263Th \simeq Tv$$
$$T_3 = 59605Tc = 262Th \simeq Tv$$
$$T_4 = T_2$$

In the case, $$T_1 + T_2 + T_3 + T_4 = 238875Tc = 4Tv.$$

Further the reading period Ti can be altered, for example, as follows for eight fields as one cycle:

$$T_1 = 59606Tc \simeq 262Th \simeq Tv$$
$$T_2 = 59833Tc \simeq 263Th \simeq Tv$$
$$T_3 = 59605Tc = 262Th \simeq Tv$$
$$T_4 = 59832Tc \simeq 263Th \simeq Tv$$
$$T_5 = 59604Tc \simeq 262Th \simeq Tv$$
$$T_6 = T_4$$
$$T_7 = T_3$$
$$T_8 = T_2.$$

In this case, $$T_1 + T_2 + T_3 + T_4 + T_5 + T_6 + T_7 + T_8 = 477750Tc = 8Tv.$$

The same advantages as obtained by the foregoing embodiment can of coure be obtained also in these cases.

The drawings and the description of the embodiment are given for illustrating the present invention and should not be interpreted as limiting or reducing the scope of the invention as defined in the appended claims. The construction of the present apparatus is not limited to that of the embodiment but can be modified variously by one skilled in the art without departing from the scope of the invention as defined in the claims. For example, the invention is of course applicable to video tape recorders.

What is claimed is:

1. An apparatus for reproducing video signals comprising signal reproducing means for reproducing video signals from a signal recording medium, a field memory for writing therein as a still picture signal one field of video signals reproduced by the signal reproducing means, and a circuit for controlling the writing of signals in the field memory and the reading of signals therefrom, wherein the controlling circuit produces a control signal for varying a period Ti of reading the still picture signal from the field memory to a plurality of different lengths of time to repeat the reading operation for the different periods as one cycle, a sum of the reading periods Ti within one cycle being equal to a vertical synchronizing signal period Tv times an integer, each of the reading periods Ti being set to a value equal to a period Tc of color subcarrier times an integer, approximate to a horizontal synchronizing signal period Th times an integer to the greatest possible extent and approximate to the vertical synchronizing signal period Tv to the greatest possible extent.

2. An apparatus as defined in claim 1, wherein a period Tw of writing are still picture signal in the field memory is set to a value equal to or slightly greater than the longest of the different reading periods Ti.

3. An apparatus as defined in claim 1, wherein the sum of the reading periods Ti within one cycle is set to four times the vertical synchronizing signal period Tv.

4. An apparatus as defined in claim 3, wherein the reading periods Ti are set to the values of:

$$T_1 = 59605 Tc$$
$$T_2 = 59832 Tc$$
$$T_3 = T_1$$
$$T_4 = 59833 Tc.$$

5. An apparatus as defined in claim 1, wherein the signal recording medium is an optical disc, and the signal reproducing means is an optical pickup.

6. An apparatus as defined in claim 5, wherein the output terminal of the pickup is connected via a demodulator circuit to a memory circuit including the field memory, and the demodulator circuit and the memory circuit are connected at their output terminals to a video monitor switchably via a change-over switch, the writing-reading controlling circuit and the change-over switch being controllable by a main control circuit.

7. An apparatus as defined in claim 1, wherein the signal recording medium is a magnetic tape, and the signal reproducing means is a magnetic head.

* * * * *